United States Patent Office
2,890,181
Patented June 9, 1959

2,890,181

ARYLOXY ACID URETHANE AND METHOD OF PREPARING SAME

Alfred W. Breiner, Racine, Wis., assignor to S. C. Johnson & Son, Inc., Racine, Wis.

No Drawing. Application August 6, 1956
Serial No. 602,460

7 Claims. (Cl. 260—2.5)

This invention relates to new urethane-modified synthetic resins possessing outstanding hardness, combined with toughness, and superior chemical resistance. More particularly, it relates to reaction products of resinous aryloxy acids and isocyanate with a substantial amount of the latter containing two or more isocyanate groups per molecule. These reactants may be formulated and applied so as to give exceedingly hard, tough, chemically resistant protective coating films and adhesives, or they may be formulated and applied so as to give low density, foamed cellular plastics of tough, rigid structure.

An object of this invention is the formulation of admixtures of the aryloxy acids and isocyanates which on further reaction form insoluble, infusible compositions and products.

Another object of this invention is the formulation of urethane-modified resinous aryloxy acid compositions which are hard, extremely tough products, possessing good chemical and water resistance.

A further object of this invention is the formulation of urethane-modified resinous aryloxy acid compositions which are low density, tough, rigid, cellular products.

Other objects of the invention will appear from the following more detailed description, with particular reference to the specific illustrative examples.

The resinous aryloxy acids used in this invention are prepared, as described in the copending Greenlee application, Serial No. 403,645, filed January 12, 1954, by reacting in the presence of alkali a dihydric phenol with a coupling agent having two functional groups which readily form ether linkages with phenolic hydroxyl groups. The amount of dihydric phenol used is in excess of the equivalent amount of the coupling agent so as to provide unreacted phenolic hydroxyl groups in the product. A part of the unreacted phenolic hydroxyl groups are then etherified in the presence of alkali with a substituted carboxylic acid. The final product is thus an aryloxy acid containing a plurality of ether oxygens and conforming to the general formula:

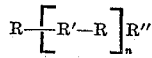

in which R is the residue of a dihydric phenol, R' represents the residue of an aliphatic coupling agent, R" constitutes the carboxyl-supplying radical, and n is an integer of from 1 to 5.

As will appear from the subsequent discussion of the reactions of specific compounds, the above formula may take the following form:

where A is an arylene radical, R is a divalent aliphatic radical having 2–10 carbon atoms, R' is a divalent aliphatic hydrocarbon radical of 1 to 7 carbon atoms and n has a value of 1 to 5 and wherein (A) and (B) are present in amounts having a ratio on an equivalent weight basis of 5:1 to 1:3.

The dihydric phenols suitable for use in making the aryloxy acids may be mononuclear such as resorcinol, hydroquinone, catechol, etc., or polynuclear, such as p,p'-dihydroxy benzophenone, p,p'-dihydroxy diphenyl, p,p'-dihydroxy dibenzyl, dihydroxy anthracenes, dihydroxy naphthalenes, bisphenols wherein the aromatic nuclei are joined by an alkyl group having from 1 to 10 carbon atoms, etc. Particularly advantageous in making the aryloxy acids herein described are the bisphenols.

The coupling agents advantageously used in building up the molecular structure desired for the resinous aryloxy monoacids are bifunctional in their reactions with the dihydric phenols in the presence of alkali. Epichlorohydrin is bifunctional in such reactions in that the epoxide group and the chloride group each react with a phenolic hydroxyl group in the presence of alkali, forming ether linkages between the epichlorohydrin residue and the dihydric phenol residue. Epihalohydrins other than epichlorohydrin, such as epibromohydrin and those structures in which one of the carbon atoms is replaced by an ether oxygen such as 2,3-epoxypropyl-2'-hydroxy-3'-chloropropyl ether may be used. The epihalohydrins suitable for use as coupling agents should be based on an aliphatic structure containing from 3 to 10 carbon atoms. Similarly, diepoxides containing 4 to 10 carbon atoms such as 1,2-epoxy-3,4-epoxybutane, or those in which one of the carbon atoms is replaced by an ether oxygen such as bis(2,3-epoxypropyl)ether may be used. Epoxides referred to herein are limited to those in which the oxygen bridges adjacent carbon atoms, also referred to as ethylene oxides.

The coupling agent may also be an aliphatic dihalide since these materials also react with phenolic hydroxyl groups to form ethers. Exemplary halides are 1,2-dichloroethane, 1,3-dichloropropane, 1,2-dibromoethane, 1,3-dibromopropane, 1,10-dichlorodecane, and the dihalides of corresponding olefins. The ethers of the dihalides may also be used in this capacity. Such dihalo ethers are dichloroethylether, dichloroisopropyl ether, dichloroethyl formal, and triglycol dichloride.

The substituted carboxylic acids suitable for use in the preparation of the resinous aryloxy monoacids are those which contain up to about 8 carbon atoms and a single functional group which is capable of reacting with phenolic hydroxyl groups to form an ether. Exemplary acids are the monohalo acids such as chloroacetic acid, 2-chlorocaprylic acid, 5-bromovaleric acid, etc.

The successive reactions leading to a typical aryloxy acid prepared from p,p'-isopropylidenediphenol, epichlorohydrin, and chloroacetic acid are as follows:

(1st step)

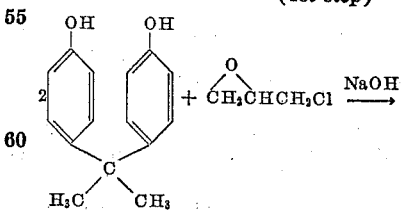

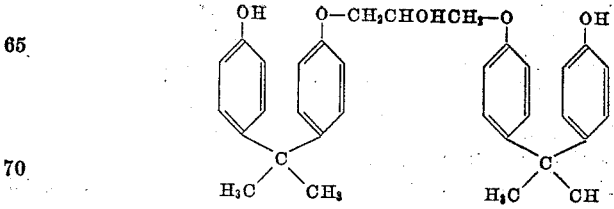

(2nd step)

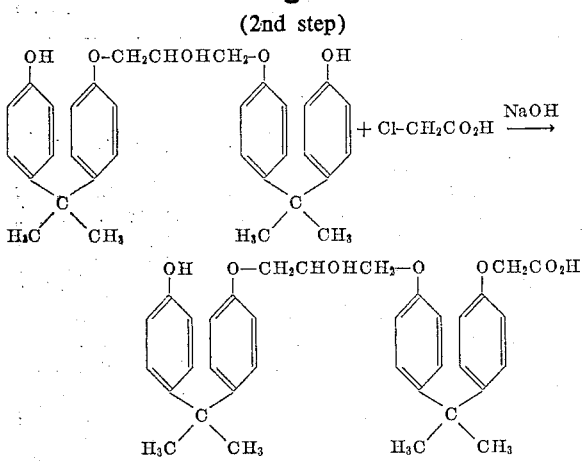

The reaction of 3 mols of p,p'-isopropylidenediphenol with 2 mols of bis (beta-chloroethyl) ether and 1 mol of chloroacetic acid would be required to give the following structure:

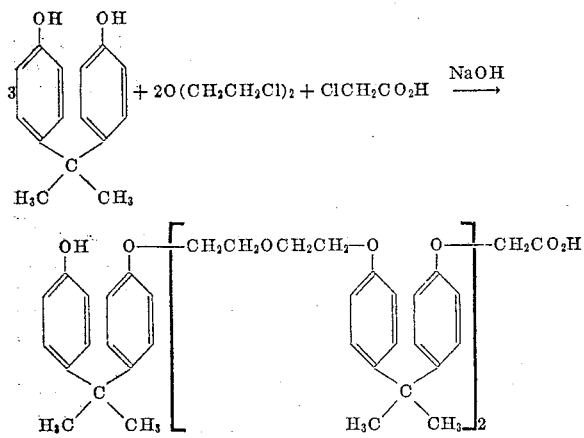

It is understood that in the illustrative reactions given above, the desired products may be obtained in predominant amounts by properly adjusting the molar proportions of materials and the reaction conditions, but the formation of products of side reactions cannot be avoided in all cases. In the preparation of the resinous monoacids, it has been found that the side reaction products are usually not present to such a degree as to be detrimental to the properties of the final urethane composition. Where side products are found to be present to an appreciable extent, it is possible to separate the same in the course of preparing the resinous acid. Such a separation is illustrated in Example II which involves the removal of the unreacted p,p'-isopropylidenediphenol after its reaction with epichlorohydrin and before the addition of chloroacetic acid to form the final aryloxy monoacids.

It will be noted that where the aliphatic coupling agent contains alcoholic hydroxyl groups, e.g. 1,3-dichloropropanol-2, and in cases where at least one of the coupling functions is an epoxide group as in epichlorohydrin, the resinous aryloxy acid will contain one or more alcoholic hydroxyl groups per molecule in addition to the phenolic hydroxyl group and the carboxyl group. With other coupling agents, such as bis(2-chloroethyl)ether and 1,4-dichlorobutane, the functional groups present in the final structure are primarily phenolic hydroxyl groups and carboxyl groups. In the latter instance there would be minor portions of alcoholic hydroxyl groups from the side reaction of hydrolysis of some alkyl halide. The method used for determining the relative portions of alcoholic and phenolic hydroxyl groups in the products containing both functions is described in "Quantitative Organic Analysis Via Functional Groups" by Sidney Siggia, pp. 4–8, published by John Wiley & Sons, Inc., New York, New York (1949).

The isocyanates used for reaction with the resinous aryloxy acids are compounds with the general formula $R—(NCX)_z$, where X may be oxygen or sulfur, $z$ an integer, one or more, and R an organic radical. These isocyanates, therefore, may be either aromatic or aliphatic or mixed aromatic, aliphatic products. Although it is necessary to have more than 50% of $z$ in these reactions equal to at least two to promote polymerization, monofunctional compounds are often desirable to modify the product. This is especially true in compositions giving a high degree of cross-linking, and in such a manner limiting the flexibility or causing premature gelation. The mono-isocyanates in such instances would serve to decrease the degree of cross-linking and thereby reduce the possibility of gelation and also give a more flexible film.

Preferred isocyanates for use in this invention are toluene 2,4 diisocyanate, toluene 2,6 diisocyanate, methylene bis(4-phenyl-isocyanate), 3,3'bitolylene 4,4'diisocyanate, hexamethylene-diisocyanate, and octadecylisocyanate. This preference is based on the commercial availability of such compounds. However, any compound of the general formula $R—(NCX)_z$, as described above, may be used. This invention thus includes the use of ethylene diisocyanate, trimethylene diisocyanate, tetramethylene diisocyanate, decamethylene diisocyanate, heptylidene diisocyanate and the corresponding diisothiocyanates; cycloalkylene diisocyanates and diisothiocyanates, e.g. cyclopentylene diisocyanate, cyclohexylene diisocyanate; aromatic diisocyanates and diisothiocyanates, e.g. m-phenylene diisocyanate, naphthalene diisocyanate and diphenyl-4,4'-diisocyanate; aliphatic-aromatic diisocyanates and diisothiocyanates, e.g. xylene-1,4-diisocyanate and 4,4'-diphenylenemethane diisocyanate; and heterocyclic diisocyanates, and diisocyanates such as $SCNCH_2OCH_2NCS$ and $SCN(CH_2)_3—S—(CH_2)_3NCS$; the isocyanates and isothiocyanates containing more than two functional groups, e.g. benzene 1,2,4-triisothiocyanate, 1,2,2-triisocyanatobutane, toluene triisocyanate; and as modifiers, the monoisocyanates and monothioisocyanates, e.g. octylisocyanate and octadecylisocyanate.

Through the following discussion the term isocyanate, for convenience is meant to include the thio compounds as well as the oxygen containing compounds unless specifically stated otherwise.

It is well known in the art that isocyanates react with phenolic hydroxyl groups, alcoholic hydroxyl groups, and carboxyl groups. The reaction of a diisocyanate, R' $(NCO)_2$, with an aliphatic or phenolic hydroxyl group may be represented as follows:

The reaction established for a diisocyanate and a carboxylic acid, $RCO_2H$, is as follows:

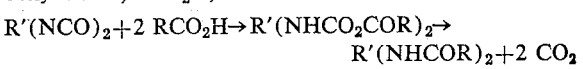

It will be seen that if the resinous aryloxy acid contains two or more functions of the group, phenolic hydroxyl, alcoholic hydroxyl, and carboxylic acid, the resulting product will be polymeric. It will also be observed that reaction with a carboxylic acid-containing compound gives carbon dioxide as a by-product, permitting the formation of cellular structure.

It has now been found that the reaction of resinous aryloxy acids with polyisocyanates provides an excellent means of obtaining polymeric resinous urethanes which are useful in forming protective coating films and foam resin structures. The resinous aryloxy acids possess a plurality of different functional groups reactive with the isocyanates and have a desirable balance between the content of hydroxyl groups and carboxyl groups. There is thus provided an optimum combination of reactive groups facilitating polymerization to an insoluble, infusible state and to readily forming foams. The cyclic and aliphatic structure found in the aryloxy acids employed herein, contribute a desirable combination of hardness and toughness to the infusible, insoluble urethane products prepared therefrom. The resinous aryloxy acids are compatible with a large number of other chemicals, including resinous types. These compounds may be used in combination with the aryloxy acids in reactions with the isocyanates to form insoluble, infusible products possessing widely varying properties.

Through this invention films which are suitable for protective coatings have been prepared having outstanding properties such as water white clarity, extreme toughness and flexibility, and outstanding chemical and water resistance. A film prepared from a composition of this invention has been subjected to 5% alkali at room temperature for over one thousand hours, to boiling water for longer than 12 hours, to boiling toluene for 1½ hours, to room temperature alcohol for 1 hour, to room temperature 10% ammonium hydroxide for 1 hour and to room temperature diethyl ether for 1 hour without any indication of failure. Compositions with such outstanding characteristics have numerous commercial applications in the protective coating field. One such application would be in the formulation of white enamel finishes where it is necessary to have extreme hardness, good chemical and water resistance, exceptional clarity of film and no unsaturation to cause yellowing of the finish due to air oxidation. By varying the composition of the acids as well as the isocyanate almost unlimited unique compositions may be obtained.

Foamed resin structures have also been prepared with the resinous aryloxy acids and isocyanates described herein. Cellular structures possessing outstanding toughness, rigidity, resistance to chemicals and water, and exceptionally low density have been obtained from these materials. Because of this exceptional combination of characteristics, these foamed resin structures have utility in air domes, sandwiched between sheets of metal or wood for building blocks, as insulating materials, etc.

The cellular structures of this invention are unique since the gaseous medium needed to foam the resinous composition is supplied internally through the liberation of the $CO_2$ formed by the reaction of the carboxyl group with the isocyanate. It is apparent therefore, that no external foaming agent is essential. Since the resinous acids have a relatively high molecular weight (approximately 600 to 1400) the foaming action is easy to control. It should also be noted that because of the use of external heat the entire foaming operation may be completed in less than one hour. In the present commercial polyurethane foams, in which water is used as the sole foaming agent, a post-curing operation of approximately 24 hours is needed. The composition and process of this invention therefore show substantial advantages over known means. It is believed that one outstanding use for the compositions of this invention will be as low density, rigid foams possessing a high degree of chemical and water resistance.

In general the process for preparing the protective coating films as described herein comprises a simple admixing of a solution containing the aryloxy acids with the isocyanate. The solvent used to cut the acid and the isocyanate, when it is desirable to cut the isocyanate, must be inert to the isocyanate and acid. Methyl ethyl ketone is an operable solvent. The admixtures of the isocyanates and acids have been found to be stable for a period of 6 to 144 hours. This stability characteristic is of particular importance in industrial applications where the admixture is made up and used as needed. The films are spread from these admixtures and are either air cured or cured at elevated temperatures. If the films are air cured it is preferred that a catalyst such as triethylamine be used to accelerate the reaction. Strongly basic catalyst such as sodium hydroxide should be avoided since the reaction may become explosive. Films can be cured in just a few minutes at elevated temperatures as illustrated in the examples.

The manufacture of foamed resin structures as herein described comprises mixing the aryloxy acid with a catalyst in a suitable reaction vessel, raising the temperature to approximately 85° C. or to a temperature where the acid is molten, adding the isocyanate while stirirng and allow to foam. The foamed structure may be heat converted an additional 5 to 30 minutes in a suitable draft oven. Although not essential, it is usually desirable to employ an emulsifier in order to obtain a more homogeneous mixture of the reactants. The instant process may be carired out readily in any system which provides for stirirng and has sufficient space for the foaming action to proceed unhindered. A modification of a unit currently used in commercial urethane foam production may also be employed. Such a system comprises two supply tanks connected to a pressure-mixing nozzle by suitable feed lines. One tank contains the isocyanate and the other tank, necessarily being heated to about 100° C., contains the aryloxy acid emulsified with the emulsifying agent and catalyst. The aryloxy acid and isocyanate would feed from the tanks to the nozzle where they would be mixed under pressure and said mixture flowed into pans and the foaming reaction allowed to proceed unhindered. The foams again may be cured in a suitable draft oven at elevated temperatuers thus accelerating the operation.

It has been observed that a wide range of proportions of the reactants may be used. Desirable films and foams have been obtained using about 10-1 to 1-8 ratio of isocyanate to acid on an equivalent basis, with marked improvement being evident when the equivalent ratio of isocyanate to acid is from about 5:1 to 1:3. It has also been observed that, while the above ratios are operable for most practical purposes an even or near even ratio is the most desired, therefore the preferred ratio of isocyanate to acid is from about 2:1 to 1:2. The probable explanation why such a wide range of proportions can be used is apparently that the aryloxy acid can self-polymerize on application of heat by a condensation reaction and the diisocyanate can polymerize by an addition reaction.

In order to have a guide in the formulation of these compositions, the amine equivalents of the isocyanates used and the isocyanate equivalent of some of the aryloxy acids were determined. Equivalents as expressed above are based on the observed amine equivalent of the isocyanate and the observed or theoretical isocyanate equivalent of the acid. The analytical procedure used to determine amine equivalents of diisocyanates is found in Monsanto Chemical Company's Technical Bulletin #P-125. Twenty-five milliliters of redistilled toluene and 25 ml. of approximately 2 N di-n-butylamine were placed in a carefully cleaned and dried 250 ml. or 500 ml. Erlenmeyer flask. The sample of diisocyanate was drawn into a warmed glass bulb and the neck sealed off in a flame. Sample weight is determined by the difference. The bulb was immersed in the Erlenmeyer flask and crushed beneath the surface of the liquid. The solution was heated to boiling and allowed to cool one hour. 100 ml. of technical methanol and 0.5 ml. of bromophenol blue indicator was added. It was then titrated with 1 N HCl to a yellow end point. The indicator was prepared by taking 0.1 g. of bromophenol blue, 1.5 ml. of 0.1 N NaOH diluted with 100 ml. of distilled $H_2O$. The average precision demonstrated by these determinations was ±1.29%.

This procedure can be modified to determine isocyanate equivalents of the resinous aryloxy acids. The isocyanate equivalent is defined as the weight of an active hydrogen-containing compound which will react with one equivalent of the isocyanate. The method used in determining the observed values reported is that of reacting a sample of the active hydrogen compound with an excess of toluene-2,4-diisocyanate and then determining the excess isocyanate by reaction with di-n-butylamine. To 25 ml. of methyl isobutyl ketone was added three grams of toluene-2,4-diisocyanate previously standardized against di-n-butylamine and a weight of the active hydrogen compound such that the diisocyanate is present in approximately 100% excess. To this mixture is added 1% of the total weight of isocyanate and the active hydrogen compound as triethylamine. The mixture is refluxed for a period of one hour. After cooling to room temperature, the condenser walls are rinsed with about 25 ml. of redistilled toluene. To this mixture is added 25 ml. of 2 N di-n-butylamine. This mixture is warmed to the boiling point and allowed to stand for one hour at which point 75 ml. of methanol is added and the excess di-n-butylamine back-titrated with 1 N alcoholic hydrochloric acid.

In order that those skilled in the art may better understand how the present invention may be practiced, the following examples are set fotrh. These examples are presented by way of illustration and not by way of limitation since there are many forms of the invention other than these specifically embodied.

Examples I to VII describe the preparation of some typical resinous aryloxy acids which are used in reaction with isocyanates to give the polyurethane-modified compositions described herein. The quantities of materials are given in parts by weight unless otherwise indicated.

*Example I*

To a solution of 456 parts of p,p'-isopropylidenediphenol dissolved in 850 parts of water containing 80 parts of caustic soda was added 92.5 parts of epichlorohydrin at 70° C., and with continuous agitation the reaction mixture was raised to approximately 95° C. holding this temperature for 1 hour after addition of the epichlorohydrin. A solution of 189 parts of chloroacetic acid and 160 parts of caustic soda dissolved in 800 parts of water was added and the mixture held at 100° C. for 1 hour at which time 476 parts of 37% hydrochloric acid and 500 parts of water were added and the mixture stirred for an additional hour. The aqueous layer was decanted and the product washed three thimes by stirring one-half hour with 200 parts of hot water, removing the water each time by decantation. The resin was dried by heating to 130° C., giving 565 parts of a product having a softening point of 77° C.

Softening points as used throughout this disclosure were run by Durran's Mercury Method (Journal of Oil and Color Chemists' Association, 12, 173–5 [1929]). Acid values are defined as the number of milligrams of potassium hydroxide which is equivalent to the acid content of one gram of the sample.

*Example II*

To a solution of 456 parts of p,p'-isopropylidenediphenol dissolved in 360 parts of water containing 80 parts of caustic soda was added 92.5 parts of epichlorohydrin at 60° C., and with continuous agitation the reaction temperature was raised to 95–100° C., and held for 1 hour after all the epichlorohydrin had been added. To the reaction mixture was added 500 parts of boiling water, the mixture stirred for about 10 minutes, and the water layer removed by decantation. This water washing was repeated twice, saving the washings which were later neutralized with acid to precipitate unreacted p,p'-isopropylidenediphenol. After adding 500 parts of hot water and adjusting the temperature to 90° C., 189 parts of chloroacetic acid dissolved in 300 parts of water containing 80 parts of caustic soda was added. The temperature was raised to 80° C., and additional caustic solution of 80 parts caustic soda in 150 parts water was added. The reaction mixture was heated to 90–100° C. and held for 1 hour, after which the aqueous layer was removed by decantation. To the agitated resinous product was added 1,000 parts of hot water and 120 parts of 37% hydrochloric acid, after which the stirring was continued at 95° C. for 45 minutes. The aqueous layer was then removed by decantation, and the resin washed three times using 2,000 parts hot water for each wash. The resin was finally dried by heating with continued agitation to 130° C. to give 841 parts of a product having a softening point 87° C., an acid value of 57, an alcoholic hydroxyl value of 110, and a phenolic hydroxyl value of 103.

*Example III*

In a caustic solution containing 53 parts caustic soda and 402 parts water was dissolved 297 parts of p,p'-isopropylidenediphenol. To this agitated mixture was added 49 parts of epichlorohydrin at 70° C., and the reaction mixture raised to approximately 95° C., holding this temperature for 45 minutes after the addition of epichlorohydrin. A solution of 90 parts chloroacetic acid and 38 parts caustic soda in 288 parts water was added and the mixture held at 95° C. for 45 minutes. To the reaction mixture was added 18 parts epichlorohydrin, and the reaction mixture was held at 95° C. for an additional 45 minutes at which time 104 parts 93% sulfuric acid which had been diluted with 292 parts water was added and stirring was continued for 45 minutes at 95° C., after which the aqueous layer was removed by decantation. The product was washed three times with hot water and dried by heating to 130° C. This resin had a softening point of 78° C., an acid value of 100, an alcoholic hydroxyl value of 97, and a phenolic hydroxyl value of 78.

*Example IV*

To 456 parts of p,p'-isopropylidenediphenol dissolved in 800 parts of water containing 80 parts of sodium hydroxide was added with continuous agitation a mixture containing 75 parts of 1,4-dichlorobutene-2, and 25 parts 1,2-dichlorobutene-2 at 56° C. The reaction mixture was raised to approximately 95° C. and held at this temperature for 1½ hours. With continuous agitation was added 232 parts of sodium chloroacetate in 600 parts of water and 100 parts of sodium hydroxide in 250 parts of water. With continuous agitation heating was continued for 1 hour at 95° C. At this point an additional 38 parts of mixed dichlorobutene was added and heating at 95° C. continued for an additional hour. The reaction mixture was neutralized with hydrochloric acid and washed and dried as in Example I to give a resinous product having an acid value of 116.

*Example V*

A portion of 1140 parts of p,p'-isopropylidenediphenol was dissolved in 1500 parts of water containing 408 parts of sodium hydroxide and 573 parts bis(beta-chloroethyl)ether was added. The reaction mixture in a closed system was heated to 150° C. and held at this temperature for 4 hours with continuous agitation. After the mixture had cooled to 98° C. the water layer was removed by decantation and the product washed with water three times in the usual manner. This intermediate resinous product was dried by heating to 150° C. to give 1365 parts of a hard brittle resin. To 355 parts of this resin dissolved in 600 parts of dimethyl sulfoxide was added 25 parts sodium hydroxide in 200 parts of water. To the constantly agitated mixture at the temperature of boiling water was added 232 parts of sodium chloroacetate dissolved in 600 parts of water over a period of 30 minutes. The reaction mixture was heated for an additional 30 minutes at 95° C. The reaction mixture was neutralized with hydrochloric acid and washed and dried as in Example I to give a product having an acid value of 35.

Example VI

As in Example V a portion of 1026 parts of p,p'-isopropylidenediphenol was dissolved in 1500 parts of water containing 325 parts of sodium hydroxide and 429 parts of bis(beta-chloroethyl)ether was placed in a closed reactor provided with a mechanical agitator and a thermometer. With continuous agitation the reaction mixture was raised to 150° C. and held at this temperature for 8 hours. After the mixture had cooled to 98° C., the water layer was removed by decantation and the product washed three times with hot water. This intermediate resinous product was dried by heating to 130° C. to give 1115 parts of a hard brittle resin having a softening point of 57° C. To 412 parts of this resin dissolved in 400 parts of water containing 40 parts of sodium hydroxide and at a temperature of 98° C. was added 116 parts of sodium chloroacetate dissolved in 300 parts of water. An additional 20 parts of sodium hydroxide dissolved in 100 parts of water was added to the reaction mixture. The reaction mixture was continuously agitated for a period of 1 hour at 95° C. The alkaline reaction mixture was then neutralized with hydrochloric acid and washed and dried to give 410 parts of a product having a softening point of 59° C. and an acid value of 49.

Example VII

A portion of 1140 parts of p,p'-isopropylidenediphenol was dissolved in 1500 parts of water containing 205 parts of sodium hydroxide and 358 parts of bis(beta-chloroethyl)ether and the reaction mixture raised to 150° C. and held at this temperature for 6 hours (a closed pressure reactor provided with agitation was required for this preparation). After the mixture had cooled to 98° C. the water layer was removed by decantation and the product washed three times with hot water in the usual manner. This intermediate resinous product was dried by heating to 130° C. to give 1275 parts of a hard brittle resin. To 263 parts of this resin dissolved in 600 parts of water containing 40 parts of sodium hydroxide and at a temperature of 98° C. was added 116 parts of sodium chloroacetate dissolved in 500 parts of water. To this mixture was added 20 parts of sodium hydroxide in 100 parts of water. The reaction mixture was continually agitated for 1 hour at 95° C. To the mixture was added 14 parts of epichlorohydrin and the reaction continued with agitation for 1 hour at 95° C. The alkaline reaction mixture was then neutralized with hydrochloric acid and washed and dried in the usual manner to give a product having an acid value of 80.2.

A selective list of isocyanates are given in the table below with abbreviations used in subsequent tables as well as pertinent information. Isocyanates other than those listed are operable in this invention.

| Commercial Source and Trade Name | Abbreviations Used in Tables | Structure | Amine Equivalent | |
|---|---|---|---|---|
| | | | Observed | Theory |
| E. I. du Pont de Nemours & Co., Inc. Hylene T | Hy T | Toluene 2,4-diisocyanate | 90.62 | 87.07 |
| E. I. du Pont de Nemours & Co., Inc. Hylene M | Hy M | Methylene bis(4-phenyl isocyanate) | 139.98 | 125.12 |
| National Aniline Div. Nacconate 200 | N 200 | 3,3' Bitolylene 4,4'-diisocyanate | 132.78 | 132.13 |
| Mobay Chemical Co. Mondur HX | MO HX | OCN(CH$_2$)$_6$NCO Hexamethylene diisocyanate | 103.39 | 84.01 |
| Mobay Chemical Co. Mondur O | MO O | CH$_3$(CH$_2$)$_{17}$NCO Octadecylisocyanate | 342.32 | 295.0 |
| Mobay Chemical Co. Mondur TM | MO TM | Tritolymethane triisocyanate | 107.78 | 123.45 |

Examples VIII through XXXVII illustrate the preparation of insoluble, infusible protective coating films from the aryloxy acids and the isocyanates tabulated above. In the preparation of the composition for heat curing to form protective coating films each of the resinous aryloxy acids was dissolved in methyl ethyl ketone to a nonvolatile content of 40 to 50%. The isocyanates were used at 100% nonvolatile content. Mixtures of the resinous aryloxy acid solutions with the isocyanates were found to be stable for periods ranging from 6 to 144 hours. Mixtures of the solutions were spread on panels with a .002″ Bird applicator and the films were baked for periods of 5 to 60 minutes at temperatures ranging from 100 to 175° C. Proportions hereinafter expressed refer to parts by weight and are based on nonvolatile content of the solutions of reactants.

Compositions of this invention may be air cured as well as by curing at elevated temperatures. By way of illustration Examples VIII, XVI, and XVII were air cured at room temperature to hard, insoluble, infusible films in 6 to 18 hours when drawn out in thin (.002″) films.

resistance which was much tougher than the product of Example XXXVIII.

*Example XL*

16 parts of Example II and 1 part of Tween 81 were charged to an open container and by means of an oil bath heated to 85° C. At this time the resinous acid was molten and easily stirred. With stirring 5.1 parts hexamethylene diisocyanate and .08 part triethyl amine catalyst were added. With continued stirring the temperature was again raised to 85° C. External heat was removed and the foaming action was allowed to proceed unhindered. The product was a low density, rigid foam being somewhat brittle.

It is also possible to obtain foams with varying densities by simply carrying out the foaming reaction at different temperatures. The following examples will illustrate this phenomenon.

*Example XLI*

320 parts of Example III, 20 parts of Tween 81, and 2.1 parts triethylamine catalyst were charged to a stainless

| Example No. | Aryloxy Acid | Parts | Isocyanate | Parts | Parts Triethyl-amine Catalyst | Conversion | | Withstood in Hours | |
|---|---|---|---|---|---|---|---|---|---|
| | | | | | | Time (Hrs.) | Temp., °C. | H₂O at 100° C. | 5% Aq. NaOH at 25° C. |
| VIII | Ex. III | 25 | MO HX | 21 | | .10 | 175 | ¹ 12 | ¹ 1006 |
| IX | Ex. III | 25 | MO HX | 21 | | .33 | 175 | ¹ 16 | ¹ 50 |
| X | Ex. III | 25 | MO HX | 21 | | .50 | 120 | ¹ 16 | ¹ 50 |
| XI | Ex. III | 25 | MO HX | 21 | | .50 | 100 | ¹ 16 | ¹ 50 |
| XII | Ex. III | 21 | HY T | 9 | | .12 | 175 | ¹ 16 | ¹ 50 |
| XIII | Ex. III | 21 | HY M | 14 | | .12 | 175 | ¹ 16 | ¹ 50 |
| XIV | Ex. III | 21 | HY M | 28 | | .12 | 175 | ¹ 16 | ¹ 50 |
| XV | Ex. III | 21 | N 200 | 13 | | .12 | 175 | ¹ 16 | ¹ 50 |
| XVI | Ex. III | 21 | N 200 | 27 | | .12 | 175 | ¹ 16 | ¹ 50 |
| XVII | Ex. I | 25 | MO HX | 21 | | .50 | 125 | ¹ 16 | ¹ 50 |
| XVIII | Ex. II | 21 | HY M | 28 | | .12 | 175 | ¹ 16 | ¹ 50 |
| XIX | Ex. IV | 21 | MO HX | 10 | | 1.0 | 175 | 1 | ¹ 50 |
| XX | Ex. IV | 21 | MO HX | 21 | | .50 | 175 | 1.5 | ¹ 50 |
| XXI | Ex. VII | 29 | MO HX | 21 | | .50 | 175 | ¹ 16 | 26 |
| XXII | Ex. VII | 29 | HY T | 18 | | .50 | 175 | 1 | ¹ 50 |
| XXIII | Ex. VII | 29 | HY M | 14 | | .50 | 175 | ¹ 16 | ¹ 50 |
| XXIV | Ex. VII | 29 | HY M | 28 | | .50 | 175 | ¹ 16 | ¹ 50 |
| XXV | Ex. VII | 29 | N 200 | 13 | | .50 | 175 | ¹ 16 | 2 |
| XXVI | Ex. VI | 44 | HY T | 9 | .26 | 1.0 | 175 | .16 | ¹ 50 |
| XXVII | Ex. VI | 44 | HY M | 28 | | .50 | 175 | ¹ 16 | ¹ 50 |
| XXVIII | Ex. VI | 44 | N 200 | 27 | | .50 | 175 | ¹ 16 | 5 |
| XXIX | Ex. V | 74 | HY M | 28 | | .50 | 175 | 2 | ¹ 50 |
| XXX | Ex. V | 74 | N 200 | 27 | | .50 | 175 | 1 | ¹ 50 |
| XXXI | Ex. V | 74 | HY T | 18 | .26 | .50 | 150 | 2 | ¹ 50 |
| XXXII | Ex. V | 74 | MO HX | 21 | .26 | .50 | 150 | 1 | ¹ 50 |
| XXXIII | Ex. V | 74 | MO HX | 21 | | .75 | 150 | 1 | ¹ 50 |
| XXXIV | Ex. III | 21 | HY M | 112 | | .50 | 150 | ¹ 16 | ¹ 50 |
| XXXV | Ex. III | 63 | HY M | 14 | | .50 | 150 | ¹ 16 | ¹ 50 |
| XXXVI | Ex. III | 25 | HY M | 14 | | 1.0 | 175 | 6 | 24 |
| XXXVII | Ex. III | 21 | MO O / MO TM | 17 / 21 | | .50 | 175 | ¹ 2 | ¹ 2 |

¹ Tests were stopped with no indication of film failure.

Examples XXXVIII through XLIII will illustrate the preparation of foam resin products.

*Example XXXVIII*

16 parts of Example III and 1 part of Tween 81, manufactured by Atlas Powder Company, a polyoxyethylene sorbitan monooleate emulsifier, were charged to an open container and heated by means of an oil bath to 85° C. At this time the resinous acid was molten and easily stirred. .08 parts triethylamine catalyst and 5.1 parts hexamethylene diisocyanate were added with stirring. Stirring was continued until the temperature reached 90° C. at which time the composition was put in a 100° C. draft oven for 10 minutes. The product was a low density, rigid foam which was very light in color and had good impact resistance.

*Example XXXIX*

16 parts of Example III and 1 part of Tween 81 were charged to an open container and the foaming process carried out as in Example XXXVIII using 7.0 parts methylene bis(4-phenyl isocyanate). The product was a medium low density, rigid foam having good impact steel beaker and heated to a temperature of 110° C. When stirred to a homogeneous mixture the resin was cast and 9.8 aliquot portions, for foaming at various temperatures, were charged to open containers. The aliquot portions were heated with stirring to the given foaming temperature. 2.9 parts hexamethylene diisocyanate were added and charge again heated to given temperature with continued stirring. External heat was removed and foaming allowed to take place unhindered. The density of these foams at the given temperature are as follows: 80° C.=.04 gram per cubic centimeter; 100° C.=.045 gram per cubic centimeter; 110° C.=.05 gram per cubic centimeter; 160° C.=.072 gram per cubic centimeter; 170° C.=.08 gram per cubic centimeter.

*Example XLII*

The procedure used is that of Example XLI with 3.9 parts methylene bis(4-phenyl isocyanate) being used in place of the hexamethylene diisocyanate. The bulking density in relation to temperature is as follows: 80° C.= .089 gram per cubic centimeter; 90° C.=.075 gram per cubic centimeter; 100° C.=.074 gram per cubic centimeter; 110° C.=.056 gram per cubic centimeter; 120°

C.=.051 gram per cubic centimeter; 130° C.=.119 gram per cubic centimeter; 150° C.=.241 gram per cubic centimeter.

*Example XLIII*

320 parts of Example VII, 20 parts Tween 81 and 2.1 parts triethyl amine catalyst were charged to a stainless steel beaker and the materials heated to 100° C. while stirring to a homogeneous mixture. 9.8 aliquot portions were weighed into open containers and foamed as in Example XLI using 3.9 parts bis(4-phenyl isocyanate). Densities of products at given temperatures are as follows: 60° C.=.110 gram per cubic centimeter; 70° C.= .100 gram per cubic centimeter; 80° C.=.087 gram per cubic centimeter; 120° C.=.085 gram per cubic centimeter; 140° C.=.066 gram per cubic centimeter; 150° C.=.065 gram per cubic centimeter; 170° C.=.047 gram per cubic centimeter; 180° C.=.072 gram per cubic centimeter; 205° C.=.075 gram per cubic centimeter.

If it is desired, water can be used to enhance the foaming action of these compositions and to permit further variation in their properties. Desirable amounts range up to about 15% based on the total weight of the composition.

*Example XLIV*

10 parts of Example II were charged to an open container and by means of an oil bath heated to 85° C. At this time the resinous acid was molten and easily stirred. 1 part of Tween 81, 1 part water and .08 parts triethylamine catalyst were added with thorough mixing. 7.5 parts hexamethylene diisocyanate were then added with stirring. Stirring was continued until a temperature of 90° C. was reached at which time the composition was put in a 100° C. draft oven for 10 minutes. The product was a low density foam with good impact resistance.

It should be appreciated that while there are above disclosed but a limited number of embodiments of this invention, it is possible to produce still other embodiments without departing from the inventive concept herein disclosed.

It is claimed and desired to secure by Letters Patent:

1. A composition of matter comprising the reaction product of (A) an organic polyisocyanate, (B) a phenoxy monocarboxylic acid of the general formula

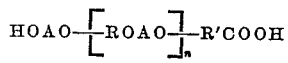

where A is an arylene radical, R is a divalent aliphatic radical of 2 to 10 carbon atoms, R' is a divalent aliphatic hydrocarbon radical of 1 to 7 carbon atoms and $n$ has a value of 1 to 5, and wherein (A) and (B) are present on an equivalent ratio of from about 5:1 to 1:3.

2. The composition of matter as described in claim 1 wherein (A) is an aromatic polyisocyanate.

3. A composition of matter as described in claim 1 wherein (A) is an aliphatic polyisocyanate.

4. A composition of matter as described in claim 1 wherein the phenoxy monocarboxylic acid has the structure

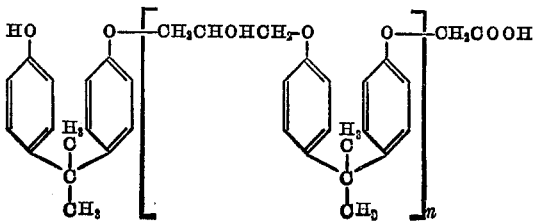

and $n$ has a value of 1 to 5.

5. A composition of matter as described in claim 1 wherein the phenoxy monocarboxylic acid has the structure

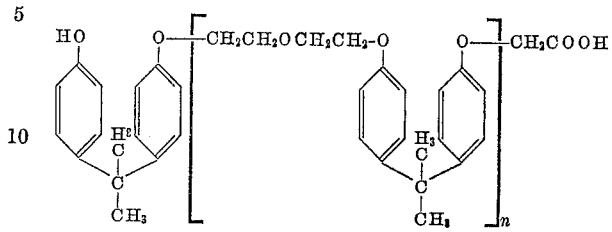

and $n$ has a value of 1 to 5.

6. A composition of matter comprising the reaction product of (A) a mixture of organic mono- and polyisocyanates wherein at least 50% of the mixture is an organic polyisocyanate and (B) a phenoxy monocarboxylic acid of the general formula

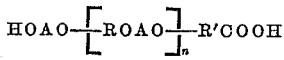

where A is an arylene radical, R is a divalent aliphatic radical of 2 to 10 carbon atoms, R' is a divalent aliphatic hydrocarbon radical of 1 to 7 carbon atoms and $n$ has a value of 1 to 5, and wherein (A) and (B) are present on an equivalent ratio of from about 5:1 to 1:3.

7. The method of preparing a composition of matter which comprises (1) heating a phenoxy monocarboxylic acid at a temperature sufficient to melt, said acid having the general formula

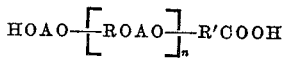

wherein A is an arylene radical, R is a divalent aliphatic radical of 2 to 10 carbon atoms, R' is a divalent aliphatic hydrocarbon radical of 1 to 7 carbon atoms and $n$ has a value of 1 to 5, (2) admixing said phenoxy acid with an organic polyisocyanate, (3) allowing the admixture to form a cellular structure by the release of carbon dioxide from the reaction of the acid with the isocyanate, and (4) curing said cellular structure by heating to 80–175° C. for 5 to 60 minutes, the equivalent ratio of the phenoxy monocarboxylic acid to organic polyisocyanate being from 5:1 to 1:3.

References Cited in the file of this patent

UNITED STATES PATENTS

| | | |
|---|---|---|
| 2,444,594 | Day et al. | July 6, 1948 |
| 2,594,979 | Nelson | Apr. 29, 1952 |
| 2,788,335 | Barthel | Apr. 9, 1957 |

FOREIGN PATENTS

| | | |
|---|---|---|
| 901,768 | France | Nov. 13, 1944 |
| 652,030 | Great Britain | Apr. 11, 1951 |